(12) United States Patent
Taguchi et al.

(10) Patent No.: US 9,158,489 B1
(45) Date of Patent: Oct. 13, 2015

(54) BUFFERING A PRINT INSTRUCTION BEFORE ITS TRANSFERRED TO A PRINTING APPARATUS

(71) Applicant: FUJI XEROX CO., LTD., Minato-ku, Tokyo (JP)

(72) Inventors: Yusuke Taguchi, Yokohama (JP); Naoya Takayama, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/339,047

(22) Filed: Jul. 23, 2014

(30) Foreign Application Priority Data

Mar. 25, 2014 (JP) .................. 2014-062331

(51) Int. Cl.
*G06F 3/12* (2006.01)
(52) U.S. Cl.
CPC .............. *G06F 3/126* (2013.01); *G06F 3/1212* (2013.01); *G06F 3/1267* (2013.01)
(58) Field of Classification Search
CPC ................................ G06F 3/126; G06F 3/1212
USPC ............................................... 358/1.15, 1.16
See application file for complete search history.

(56) References Cited

U.S. PATENT DOCUMENTS

| 8,498,000 B1 | 7/2013 | Komazawa | |
|---|---|---|---|
| 2003/0226464 A1* | 12/2003 | Mathieson | 101/484 |
| 2005/0162667 A1* | 7/2005 | Felix et al. | 358/1.1 |

FOREIGN PATENT DOCUMENTS

| JP | 2000-10749 A | 1/2000 |
|---|---|---|
| JP | 2013-200627 A | 10/2013 |

* cited by examiner

*Primary Examiner* — Eric A Rust
(74) *Attorney, Agent, or Firm* — Sughrue Mion, PLLC (57) ABSTRACT

A printing control apparatus including: a receiving unit that receives a print instruction to instruct printing on a recording medium; a transferring unit that transfers the print instruction received by the receiving unit to an outputting portion which is capable of storing plural print instructions and outputs the stored print instruction one by one to a printing device; and a controller that controls the transferring unit so that another print instruction is transferred to the outputting portion if a print instruction transferred by the transferring unit last is started to be outputted from the outputting portion to the printing device.

7 Claims, 10 Drawing Sheets

BUFFERING A PRINT INSTRUCTION BEFORE ITS TRANSFERRED TO A PRINTING APPARATUS

CROSS REFERENCE TO RELATED APPLICATIONS

This application is based on and claims priority under 35 USC §119 from Japanese Patent Application No. 2014-062331 filed Mar. 25, 2014.

BACKGROUND

1. Technical Field

The present invention relates to a printing control apparatus, a printing control system and a non-transitory computer readable medium.

2. Related Art

There exists a printing control apparatus which stores a print job therein and performs control of outputting a print job to a printing device.

SUMMARY

According to an aspect of the present invention, there is provided a printing control apparatus including: a receiving unit that receives a print instruction to instruct printing on a recording medium; a transferring unit that transfers the print instruction received by the receiving unit to an outputting portion which is capable of storing plural print instructions and outputs the stored print instruction one by one to a printing device; and a controller that controls the transferring unit so that another print instruction is transferred to the outputting portion if a print instruction transferred by the transferring unit last is started to be outputted from the outputting portion to the printing device.

BRIEF DESCRIPTION OF THE DRAWINGS

An exemplary embodiment of the present invention will be described in detail based on the following figures, wherein:

FIGS. 5-1A and 5-1B are diagrams for explaining a specific example of a processing in which a print job is transferred from the printing control apparatus to the printing device;

FIGS. 5-2C and 5-2D are diagrams for explaining a specific example of a processing in which a print job is transferred from the printing control apparatus to the printing device;

FIGS. 5-3E and 5-3F are diagrams for explaining a specific example of a processing in which a print job is transferred from the printing control apparatus to the printing device;

DETAILED DESCRIPTION

Hereinafter, an exemplary embodiment of the present invention will be described in detail with reference to the attached drawings.

First Exemplary Embodiment

Overall Configuration of System

Figure 1:
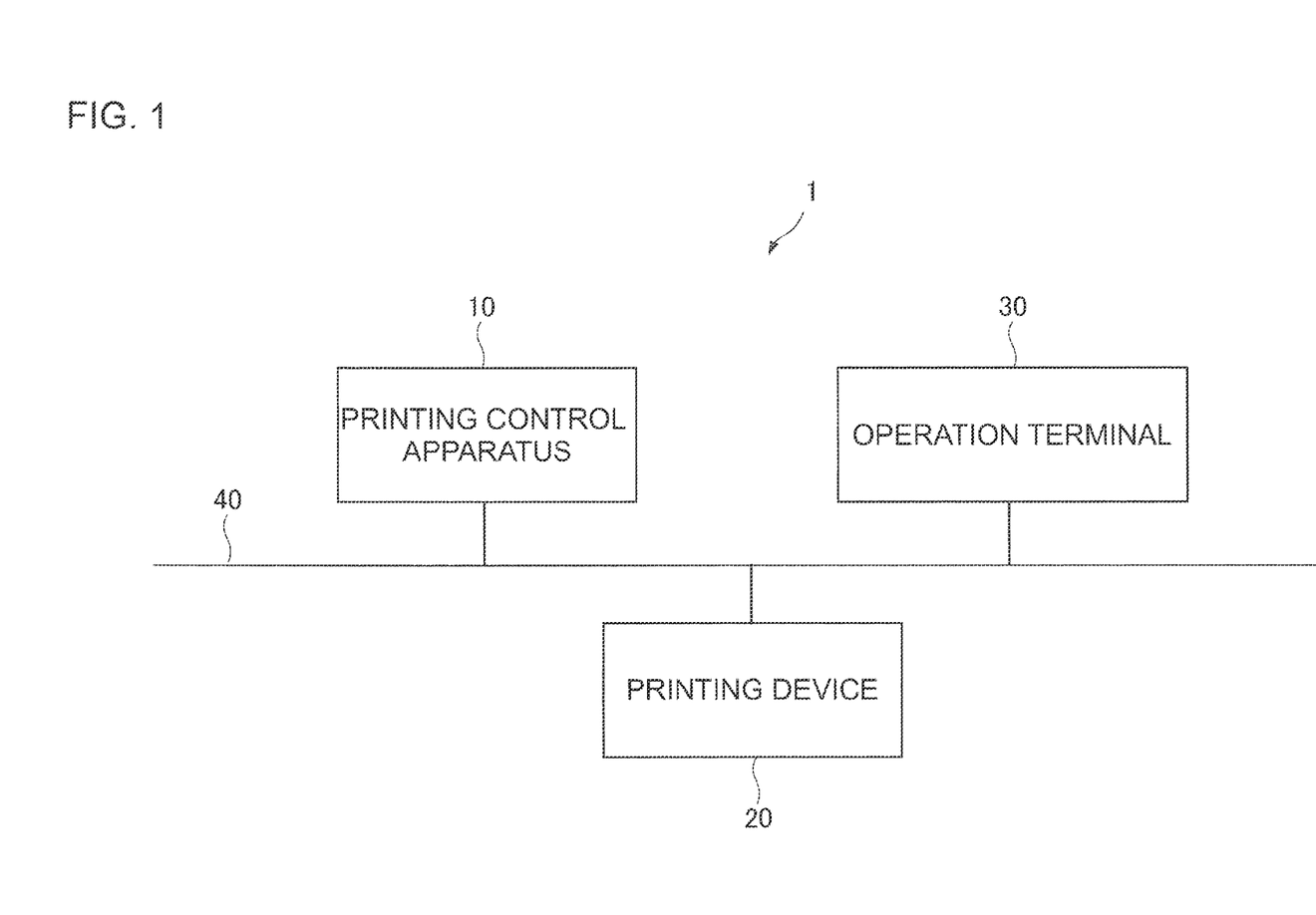
FIG. 1 is a diagram showing a specific example of a schematic configuration of a printing control system in the present exemplary embodiment.
Figures 1A, 5:
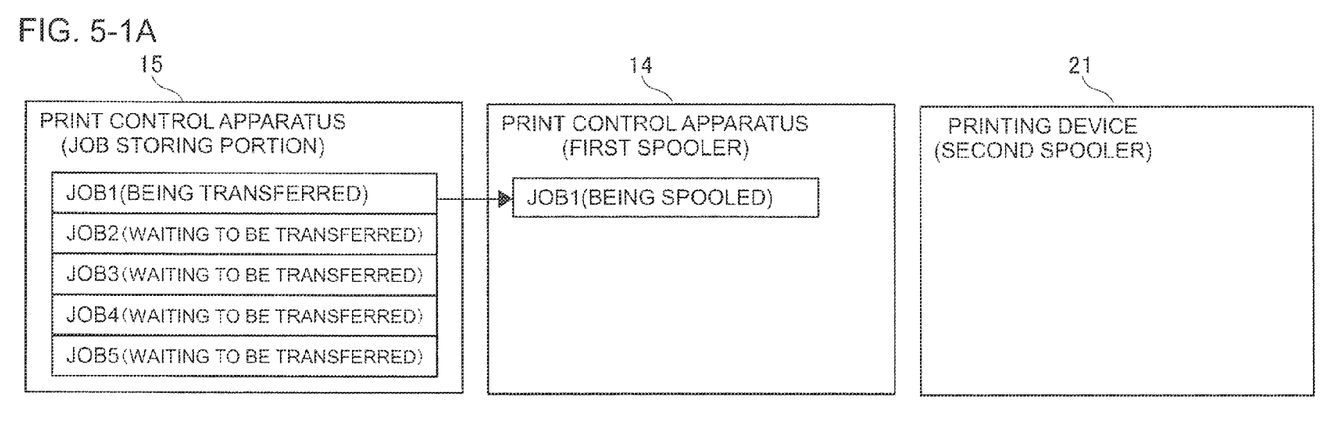
Figures 1B, 5:
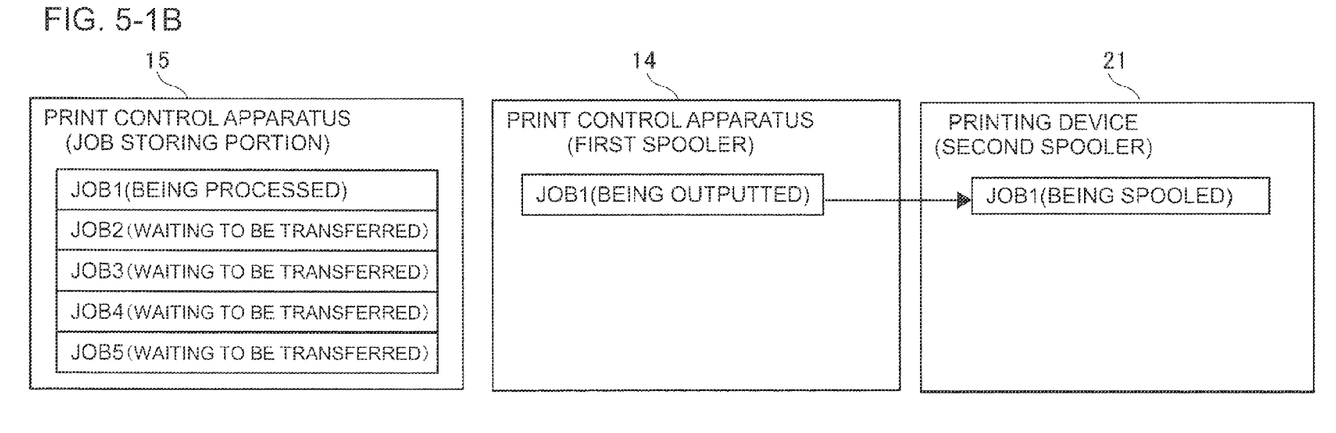

First of all, an overall configuration of a printing control system 1 will be explained. FIG. 1 is a diagram showing a specific example of a schematic configuration of the printing control system 1 in the present exemplary embodiment. The printing control system 1 in the present exemplary embodiment includes a printing control apparatus 10, a printing device 20 and an operation terminal 30, which are connected to a network 40.

The printing control apparatus 10 sequentially transfers a print job transmitted from the operation terminal 30 to the printing device 20 (the details will be described later). Here, a print job includes image data to be printed and a control command which describes settings in a print processing, and represents a unit of data for the print processing performed in the printing device 20. The printing control apparatus 10 has a spool function temporarily storing a print job in a spooler and outputting the print job from the spooler in order. In the printing control apparatus 10, a processing state in the spooler is monitored and the spooler is controlled to adjust the timing of transferring a print job so as not to change the order of printing. Hereinafter, the printing control apparatus 10 includes a first spooler 14 (refer to FIG. 2) as the spooler. In the present exemplary embodiment, a print job is used as an example of a print instruction.

The printing device 20 is, for example, a device which has a scan function, a print function, a copy function, a facsimile function and the like, and performs a print processing by forming an image on a recording medium such as a sheet based on a print job transferred from the printing control apparatus 10. Here, the printing device 20 has a spool function as well and executes a print processing by outputting a print job from a spooler in response to an operation by a user. Hereinafter, the printing device 20 includes a second spooler 21 (refer to FIG. 2) as the spooler.

The operation terminal 30 is a terminal operated by a user when data such as an image and a document are to be printed. For example, the operation terminal is a Personal Computer (PC). The operation terminal 30 generates a print job in response to an operation by a user, and transmits the generated print job to the printing control apparatus 10.

The network 40 as an example of a communication line is a communication unit which is used for information communication among the printing control apparatus 10, the printing device 20, and the operation terminal 30. For example, the network 40 is a Local Area Network (LAN). In the present exemplary embodiment, the printing control apparatus 10, the printing device 20 and the operation terminal 30 are configured to be connected with the network 40; however, the configuration of the printing control apparatus 10, the printing device 20, and the operation terminal 30 is not limited to the configuration in the present exemplary embodiment. For example, a configuration may be used in which a network connecting the printing control apparatus 10 with the printing device 20 and a network connecting the printing control apparatus 10 with the operation terminal 30 separately exist.

As described above, the printing control system 1 transmits a print job to the printing device 20 not directly from the operation terminal 30 but through the printing control apparatus 10 in order to execute a print.

<Functional Configuration of Printing Control Apparatus>

Figure 2:
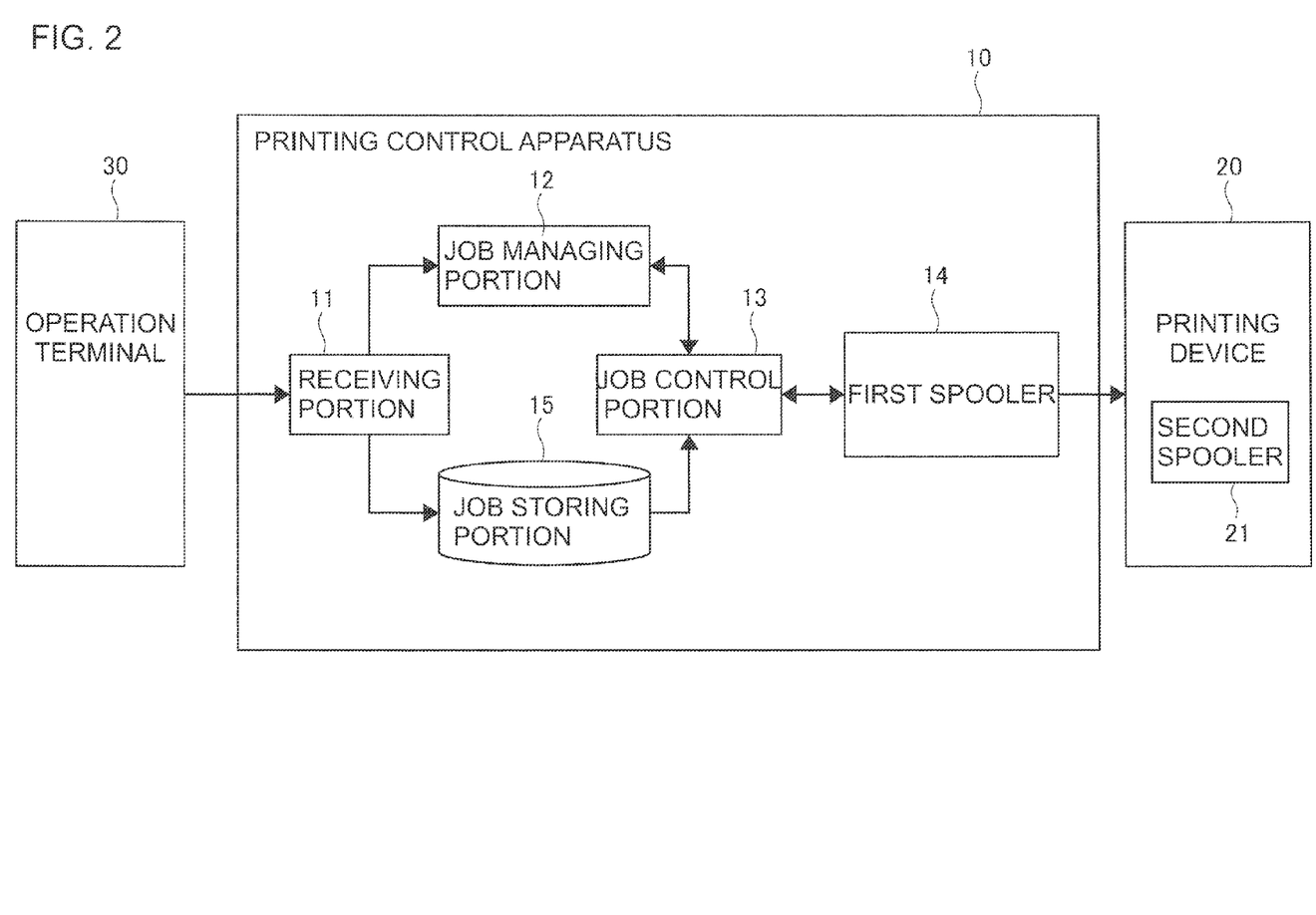
FIG. 2 is a block diagram showing a specific example of a functional configuration of a printing control apparatus in the first exemplary embodiment.
Figures 2C, 5:
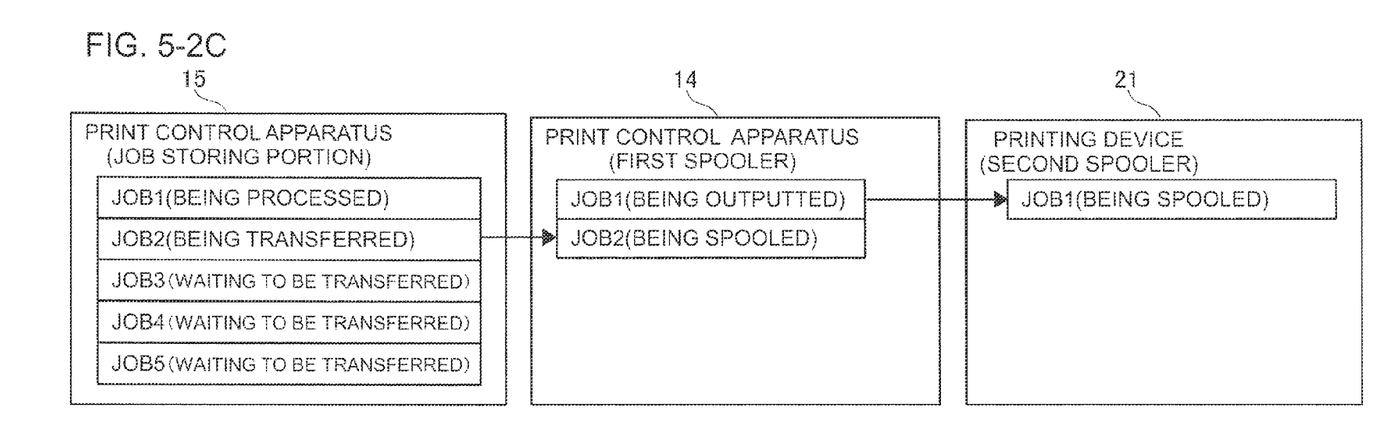
Figures 2D, 5:
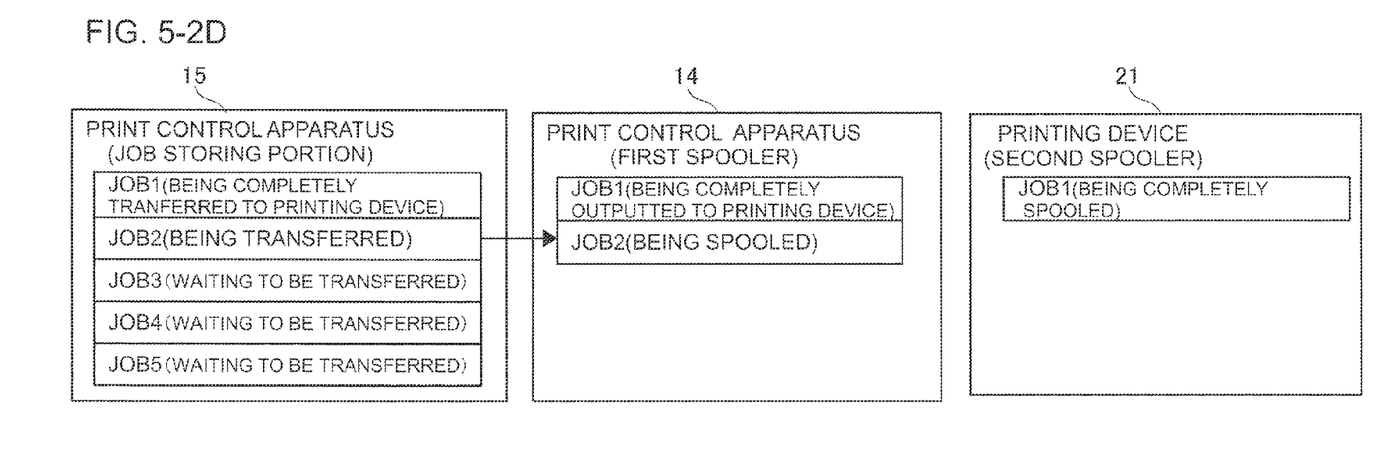

Next, a functional configuration of the printing control apparatus 10 will be explained. FIG. 2 is a block diagram showing a specific example of the functional configuration of the printing control apparatus 10 in the first exemplary embodiment.

The printing control apparatus 10 includes a receiving portion 11 which receives a print job, a job managing portion 12 which manages a status of a print job received by the receiving portion 11, a job control portion 13 which acquires a print job from a below-described job storing portion 15 and performs control of transferring the print job to the first spooler 14, the first spooler 14 which temporarily stores a transferred print job and outputs the stored print job to the second spooler 21 of the printing device 20, and the job storing portion 15 which stores the print job received by the receiving portion 11.

The receiving portion 11 as an example of a receiving unit receives a print job transmitted from the operation terminal 30.

The job managing portion 12 manages a status of a print job received by the receiving portion 11. When the receiving portion 11 receives a print job, the job managing portion 12 instructs the job control portion 13 to transfer the received print job.

The job storing portion 15 stores the print job received by the receiving portion 11.

The job control portion 13, as an example of a transferring unit, a controller and a monitoring unit, acquires a print job from the job storing portion 15 and transfers the acquired print job to the first spooler 14 in accordance with the processing state in the first spooler 14 when the job control portion 13 receives a transfer instruction from the job managing portion 12. Here, in the case where a print job whose transfer has been instructed by the job managing portion 12 but still untransferred to the first spooler 14 is stored in the job storing portion 15, the job control portion 13, for example, periodically acquires a processing state of a print job in the first spooler 14 to monitor the processing state of the print job stored in the first spooler 14. The job control portion 13 determines whether a print job stored in the job storing portion 15 is transferable to the first spooler 14 or not.

In the determination, the job control portion 13 first acquires a status indicating a state of a processing of a print job transferred to the first spooler 14 last (hereinafter referred to as the last job) among print jobs stored in the first spooler 14. When the last job is started to be transferred from the first spooler 14 to the printing device 20, the job control portion 13 determines that another print job is newly transferable to the first spooler 14.

That is, the job control portion 13 determines that a print job is transferable to the first spooler 14 when the job control portion 13 detects that the last job is in the status of being outputted to the printing device 20 (being outputted from the first spooler 14 to the second spooler 21) or in the status of being completely outputted to the printing device 20 (having been finished to be outputted from the first spooler 14 to the second spooler 21). Additionally, the job control portion 13 performs transfer control of print jobs so that the sum of print jobs being transferred to the first spooler 14 and print jobs waiting to be outputted to the printing device 20 among print jobs transferred to the first spooler 14 does not become two or more.

The job control portion 13 acquires one print job from the job storing portion 15 and transfer the print job to the first spooler 14 when the job control portion 13 determines that a print job is transferable to the first spooler 14. Here, the job control portion 13 transfers a print job in order of receipt by the receiving portion 11. On the other hand, the job control portion 13 executes a transfer determining processing when the job control portion 13 determines that a print job is not transferable to the first spooler 14. The transfer determining processing is a processing in which the job control portion 13 waits until a print job becomes transferable to the first spooler 14. Details of the transfer determining processing will be described below.

The job control portion 13 converts a format of a print job into a format that can be outputted by the printing device 20 when the job control portion 13 transfers the print job to the first spooler 14.

The first spooler 14 as an example of an output portion temporarily stores (spools) a print job transferred from the job control portion 13, and sequentially outputs the print job to the second spooler 21 in the printing device 20. The first spooler 14 is configured with a printer driver utilized for using the printing device 20 and the like. Here, the first spooler 14 is able to store plural print jobs; however, the first spooler 14 does not output plural print jobs to the printing device 20 at one time, and outputs a print job one by one in order. After the first spooler 14 outputs a print job, the first spooler 14 keeps storing the outputted print job until the print processing of the outputted print job is completed in the printing device 20.

As the first spooler 14, for example, Windows (a registered trademark in Japan) spooler and the like are generally used. For example, in the case where Windows spooler is used, a user can use a various kind of devices supporting Windows spooler.

<Explanation of Transfer Processing of Print Job>

Figure 3:
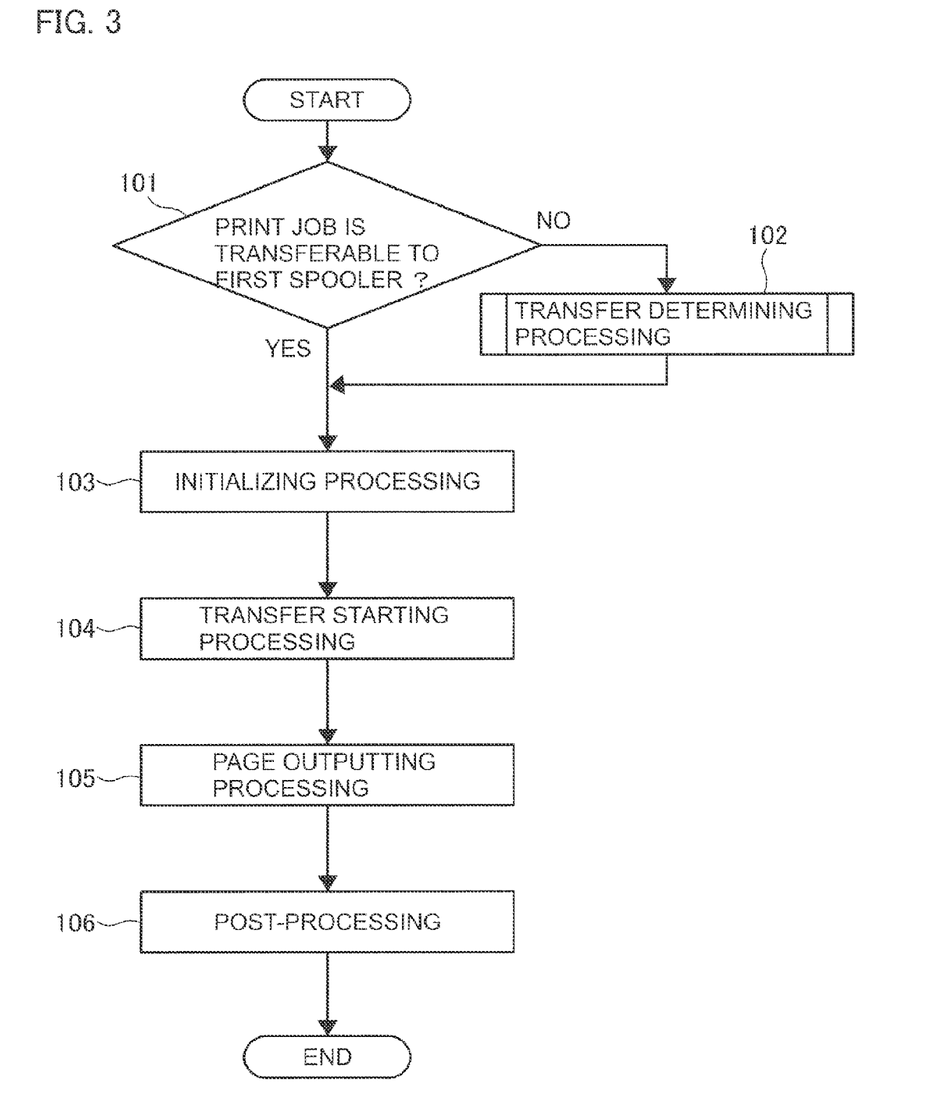
FIG. 3 is a flowchart showing a specific example of a procedure of transferring processing of a print job by a job control portion.
Figures 3E, 5:
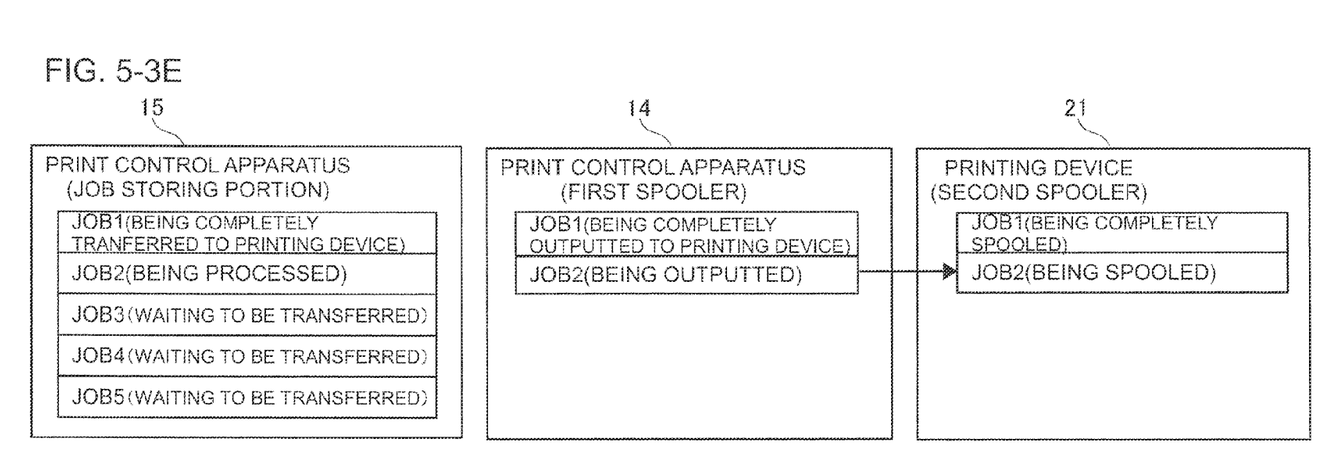
Figures 3F, 5:
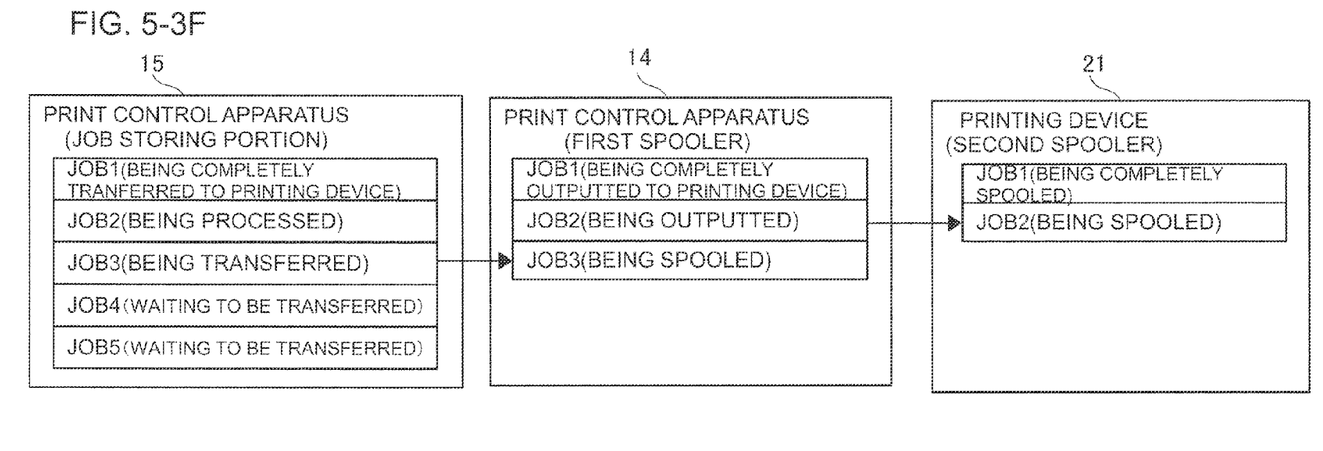

Next, transfer processing of a print job by the job control portion 13 will be explained. FIG. 3 is a flowchart showing a specific example of a procedure of transfer processing of a print job by the job control portion 13. The job control portion 13 executes the procedure shown in FIG. 3 per a print job stored in the job storing portion 15, and acquires the print job from the job storing portion 15 to sequentially transfer the print job to the first spooler 14.

First, in the case where a print job whose transfer has been instructed by the job managing portion 12 but still untransferred to the first spooler 14 is stored in the job storing portion 15, the job control portion 13 determines whether a print job is transferable to the first spooler 14 or not (step 101). In the case where the last job transferred to the first spooler 14 is in the status of being outputted to the printing device 20 or in the status of being completely outputted to the printing device 20, the job control portion 13 determines that the next print job is transferable to the first spooler 14 (YES in step 101).

On the other hand, in the case where the last job is neither in the status of being outputted to the printing device 20 nor in the status of being completely outputted to the printing device 20, the job control portion 13 determines that the next print job is not transferable to the first spooler 14 (NO in step 101). When the job control portion 13 makes a determination that the next print job is not transferable to the first spooler 14, the last job is, for example, in the status of waiting to be outputted to the printing device 20, or in the status of being transferred (spooled) from the job storing portion 15 to the first spooler 14 through the job control portion 13 and the like. In the case of the negative determination (NO) in step 101, the job control portion 13 executes the transfer determining processing (step 102).

After the positive determination (YES) in step 101 or after the transfer determining processing in step 102, the job control portion 13 transfers a print job to the first spooler 14 by executing the processing in step 103 to step 106, which is a related art. Here, the job control portion 13 executes an initializing processing in transfer of a print job (step 103). In the initializing processing, the job control portion 13, for example, acquires data related to a print job to be transferred, environmental data of the first spooler 14 and the like. Next, the job control portion 13 executes a transfer starting processing (step 104). In the transfer starting processing, the job control portion 13, for example, executes a processing of setting an initial page number of a print job to be transferred, a processing of reading the first page and the like.

Next, the job control portion 13 executes a page outputting processing (step 105). In the page outputting processing, the job control portion 13 determines which page to transfer while checking the number of the rest of the pages and sequentially outputs the pages. After the job control portion 13 finishes outputting all the pages in the page outputting processing, the job control portion 13 executes a post-processing (step 106). In the post-processing, the job control portion 13, for example, executes a processing of renewing the number of the pages finished to be transferred, a processing of a page adjustment after a banner page printing and the like. Finally, the present processing flow is completed In such a manner, the job control portion 13 monitors the processing state in the first spooler 14 and transfers a print job stored in the job storing portion 15 to the first spooler 14.

The job control portion 13, in step 101, determines whether a print job is transferable or not based on the status of the last job; however, in the case where a print job transferred by the job control portion 13 is not stored in the first spooler 14, the job control portion 13 determines that a print job is transferable to the first spooler 14.

For example, in the case where the job control portion 13 transfers a print job to the first spooler 14 for the first time, no print job is stored in the first spooler 14. For example, when the last job is outputted to the printing device 20 immediately after the last job has been spooled in the first spooler 14 and the print processing of the last job is completed, the last job is removed from the first spooler 14 without the job control portion 13 confirming the last job being outputted to the printing device 20. In this manner, in the case where the last job and the other print jobs are not stored in the first spooler 14, a new print job may be transferred to the first spooler 14.

<Explanation of Transfer Determining Processing>

Figure 4:
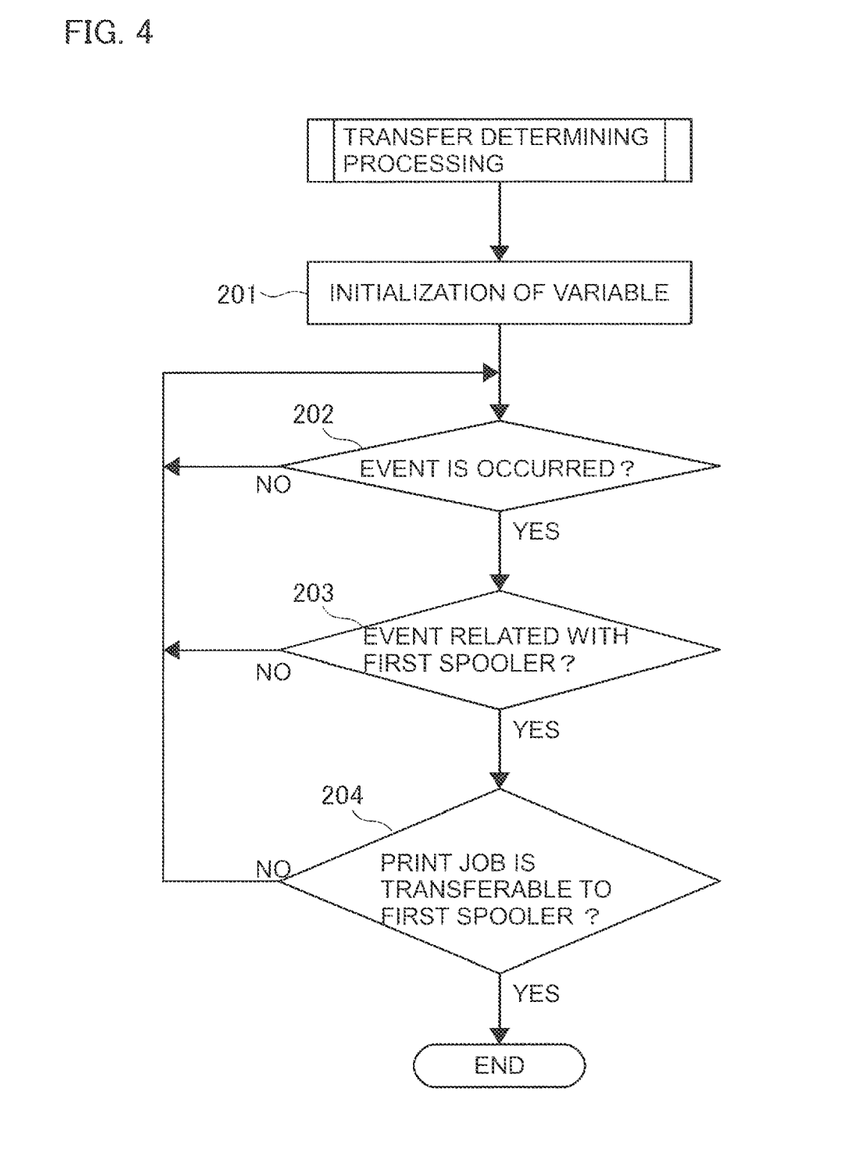
FIG. 4 is a flowchart showing a specific example of a procedure of transfer determining processing in the first exemplary embodiment.

Next, transfer determining processing by the job control portion 13 will be explained. FIG. 4 is a flowchart showing a specific example of a procedure of transfer determining processing in the first exemplary embodiment.

First, the job control portion 13 executes an initialization of a variable for detecting an event indicating some processing in the printing control apparatus 10 (step 201). Here, the job control portion 13, for example, acquires a discrimination ID used for discriminating the printing device 20 to which a print job is to be transferred. Next, the job control portion 13 determines whether an event indicating some processing in the printing control apparatus 10 is occurred or not (step 202). In the case where an event is occurred (YES in step 202), the job control portion 13 determines whether the occurred event is an event related with the first spooler 14 that outputs a print job to the printing device 20 or not (step 203). On the other hand, in the case where an event is not occurred (NO in step 202), the job control portion 13 waits until an event is occurred.

Next, in step 203, in the case where the occurred event is an event related with the first spooler 14 (YES in step 203), the status of the print job in the first spooler 14 changes, and thus the job control portion 13 determines whether a print job is transferable to the first spooler 14 or not (step 204). The processing in step 204 is the same as the processing of step 101 in FIG. 3, and therefore, the explanation of the details is omitted. On the other hand, in the case where the occurred event is not an event related with the first spooler 14 (NO in step 203), step 202 is executed.

Next, in step 204, in the case where the job control portion 13 determines that a print job is transferable to the first spooler 14 (YES in step 204), the present processing flow is completed. After the present processing flow is completed, the processing of step 103 in FIG. 3 is sequentially executed. On the other hand, in the case where the job control portion 13 determines that a print job is not transferable to the first spooler 14 (NO in step 204), the process moves to step 202.

In such a manner, the job control portion 13 waits while monitoring the processing state in the first spooler 14 until the job control portion 13 determines that a print job is transferable to the first spooler 14, that is, until the status of the last job becomes the status of being outputted to the printing device 20 or the status of being completely outputted to the printing device 20.

<Specific Example of Transferring Processing of Print Job>

A specific example of a processing of transferring a print job from the printing control apparatus 10 to the printing device 20 will be explained. FIG. 5-1A, FIG. 5-1B, FIG. 5-2C, FIG. 5-2D, FIG. 5-3E, and FIG. 5-3F are diagrams for explaining a specific example of a processing in which a print job is transferred from the printing control apparatus 10 to the printing device 20. In FIG. 5-1A, FIG. 5-1B, FIG. 5-2C, FIG. 5-2D, FIG. 5-3E, and FIG. 5-3F, five print jobs are respectively regarded as a job 1 to a job 5. The five print jobs are inputted so as to be printed in order from the job 1 and the receiving portion 11 receives the five print jobs in order from the job 1. As described above, the job managing portion 12 manages a status of a print job; however, in an example shown in FIG. 5-1A to FIG. 5-3F, in addition to a print job stored in the job storing portion 15, a status of a print job managed by the job managing portion 12 will be explained.

First of all, each processing state of the respective print job in FIG. 5-1A will be explained. Firstly, in the case where the job 1 is not yet transferred by the first spooler 14, no print job exists in the first spooler 14, and thus the job control portion 13 determines that the job 1 is transferable to the first spooler 14. When the job 1 is started to be transferred to the first spooler 14, as shown in FIG. 5-1A, the job managing portion 12 sets the status of the job 1 to "being transferred" and the first spooler 14 sets the status of the job 1 to "being spooled". The job 2 to the job 5 are waiting to be transferred from the job storing portion 15 to the first spooler 14, and the job managing portion 12 sets the statuses of the job 2 to the job 5 to "waiting to be transferred".

Next, when the job 1 is completely transferred to the first spooler 14, output of the job 1 from the first spooler 14 to the second spooler 21 is sequentially started. When the output of the job 1 to the second spooler 21 is started, as shown in FIG. 5-1B, the job managing portion 12 sets the status of the job 1 to "in process", the first spooler 14 sets the status of the job 1 to "being outputted", and the second spooler 21 sets the status of the job 1 to "being spooled".

Here, as shown in FIG. 5-1A, while the job 1 is in the status of "being spooled" in the first spooler 14, the job control portion 13 determines that the job 2, which is the next print job, is not transferable to the first spooler 14. On the other hand, as shown in FIG. 5-1B, when the output of the job 1 to the second spooler 21 is started, the status of the last job (that is, the job 1) becomes the status of being outputted to the second spooler 21. Therefore, the job control portion 13 determines that the job 2, which is the next print job, is transferable to the first spooler 14.

FIG. 5-2C is a diagram showing the case where the job 2 in FIG. 5-1B is started to be transferred from the job storing portion 15 to the first spooler 14 through the job control portion 13. When the transfer of the job 2 to the first spooler 14 is started, the job managing portion 12 sets the status of the job 2 to "being transferred", and the first spooler 14 sets the status of the job 2 to "being spooled".

FIG. 5-2D is a diagram showing the case where the job 1 in FIG. 5-2C is completely outputted from the first spooler 14 to the second spooler 21. When the output of the job 1 to the second spooler 21 is completed, the job managing portion 12 sets the status of the job 1 to "being completely transferred to the printing device", the first spooler 14 sets the status of the job 1 to "being completely outputted to the printing device", and the second spooler 21 sets the status of the job 1 to "being completely spooled". For example, a print processing of the job 1 is executed in the printing device 20 in response to an operation by a user and the like.

When the output of the job 1 to the second spooler 21 is completed, the first spooler 14 becomes in the state of being able to newly output a print job to the second spooler 21. Therefore, in FIG. 5-2D, the job 2 is being transferred from the job storing portion 15 to the first spooler 14 through the job control portion 13, and when the job 2 is completely transferred to the first spooler 14, output of another print job from the first spooler 14 to the second spooler 21 is sequentially started.

FIG. 5-3E is a diagram showing a case where the job 2 in FIG. 5-2D is started to be outputted from the first spooler 14 to the second spooler 21. When output of the job 2 to the second spooler 21 is started, the job managing portion 12 sets the status of the job 2 to "in process", the first spooler 14 sets the status of the job 2 to "being outputted", and the printing device 20 sets the status of the job 2 to "being spooled". When output of the job 2 to the second spooler 21 is started, the status of the last job (that is, the job 2) becomes the status of being outputted to the second spooler 21. Therefore, the job control portion 13 determines that the job 3, which is the next print job, is transferable to the first spooler 14.

FIG. 5-3F is a diagram showing a case where the job 3 in FIG. 5-3E is started to be transferred from the job managing portion 12 to the first spooler 14. When the transfer of the job 3 to the first spooler 14 is started, the job managing portion 12 sets the status of the job 3 to "being transferred" and the first spooler 14 sets the status of the job 2 to "being spooled".

When output of the job 2 to the printing device 20 is completed and output of the job 3 to the second spooler 21 is started, transfer of the job 4, which is in the status of "waiting to be transferred," from the job storing portion 15 to the first spooler 14 is started. In the similar procedure, transfer of the job 5 from the job storing portion 15 to the first spooler 14 is executed.

In the example shown in FIG. 5-2D, explanation has been made on the case where the output of the job 1 to the second spooler 21 is completed before the transfer of the job 2 to the first spooler 14 is completed; however, the transfer of the job 2 to the first spooler 14 can be completed before the output of the job 1 to the second spooler 21 is completed. In this case, the job 2 waits to be outputted to the second spooler 21, and upon completion of the output of the job 1 to the second spooler 21, the job 2 is outputted to the second spooler 21.

As explained above, the job control portion 13 monitors the processing state in the first spooler 14, and the job control portion 13 newly transfers a print job from the job storing portion 15 to the first spooler 14 when the last job is in the status of being outputted to the printing device 20 or in the status of being completely outputted to the printing device 20. That is, when the print job transferred to the first spooler 14 last is started to be outputted to the printing device 20, a print job is newly transferred from the job storing portion 15 to the first spooler 14 through the job control portion 13. Therefore, in the first spooler 14, the sum of print jobs being transferred (spooled) to the first spooler 14 and print jobs waiting to be outputted to the printing device 20 does not become two or more.

For example, there are cases where two or more print jobs waiting to be transferred to the printing device 20 are stored in the first spooler 14 if a print job is transferred without monitoring the first spooler 14. In such cases, when the first spooler 14 firstly transfers a print job stored later to the printing device 20, the print processing is executed in a wrong order of printing. Thus, utilizing the printing control apparatus 10, for example, prevents an order of a print processing from being changed compared with the configuration in which a print job is transferred to the first spooler 14 without monitoring processing states of print jobs.

The printing control apparatus 10 controls transfer of print jobs so that a processing of receiving and spooling a print job and a processing of outputting another print job are executed in parallel in the first spooler 14. Thus, utilizing the printing control apparatus 10, for example, suppresses a decrease of processing speed of print jobs compared with the configuration in which another print job is newly transferred to the first spooler 14 after a print job is completely outputted from the first spooler 14 to the printing device 20.

Second Exemplary Embodiment

Next, the second exemplary embodiment will be explained. The printing control apparatus 10 in the present exemplary embodiment further includes a Management Information Base (MIB) acquiring portion 16 which acquires MIB information of the printing device 20 in addition to the configurations included in the printing control apparatus 10 in the first exemplary embodiment. The printing control apparatus 10 in the first exemplary embodiment performs transfer control of print jobs while monitoring the processing state in the first spooler 14. On the other hand, the printing control apparatus 10 in the present exemplary embodiment acquires MIB information indicating the processing state in the second spooler 21 of the printing device 20 and performs transfer control of print jobs based on the acquired MIB information. It should be noted that, in the present exemplary embodiment, the configurations similar with those in the first exemplary embodiment are denoted with the same reference numerals and the detailed explanations thereof are omitted.

<Functional Configuration of Printing Control Apparatus>

Figure 6:
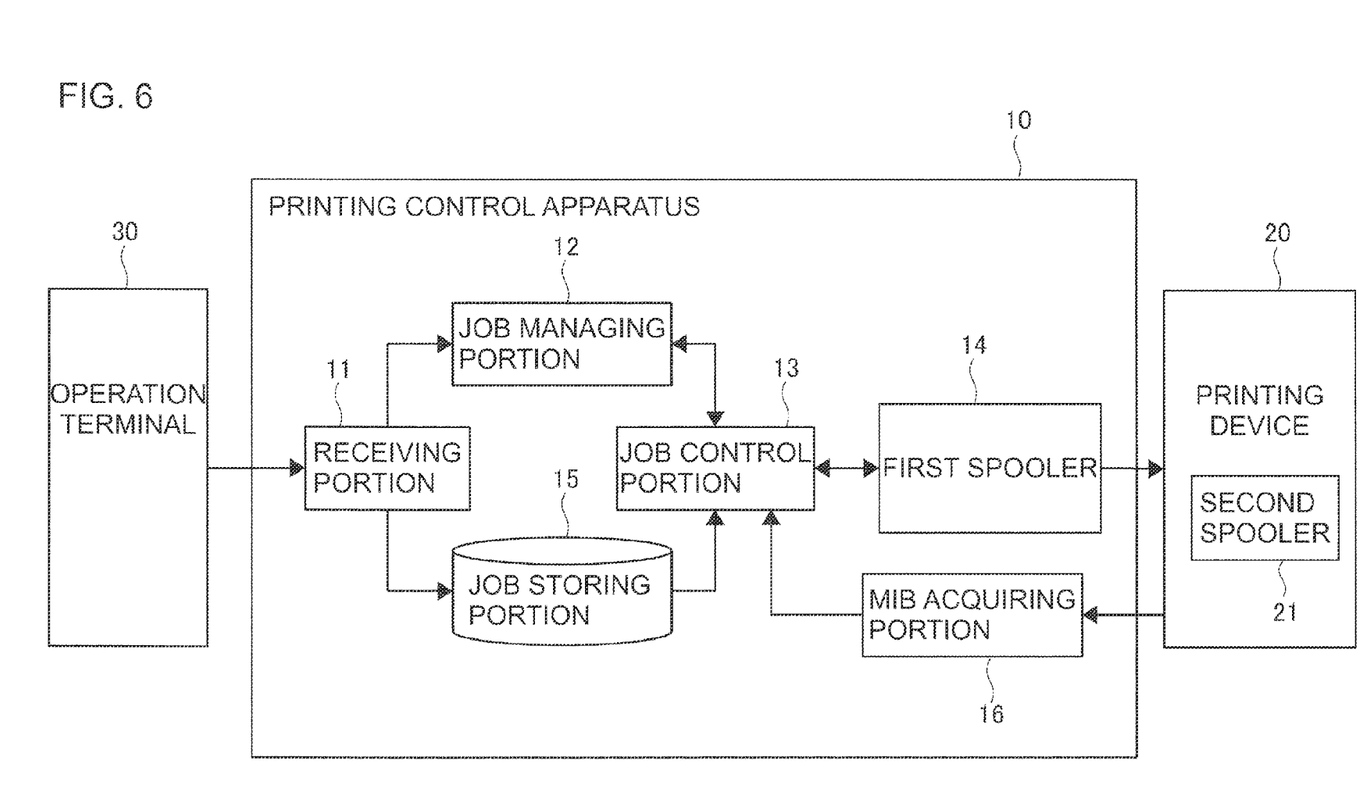
FIG. 6 is a block diagram showing a specific example of a functional configuration of a printing control apparatus in the second exemplary embodiment.

First, a functional configuration of the printing control apparatus 10 will be explained. FIG. 6 is a block diagram showing a specific example of the functional configuration of the printing control apparatus 10 in the present exemplary embodiment. The printing control apparatus 10 in the present exemplary embodiment includes the receiving portion 11, the job managing portion 12, the job control portion 13, the first spooler 14 and an MIB acquiring portion 16 as an example of an acquiring unit. Here, functions of the receiving portion 11, the job managing portion 12 and the first spooler 14 are the same as those in the first exemplary embodiment.

The MIB acquiring portion 16 newly added in the present exemplary embodiment, for example, periodically acquires MIB information from the printing device 20 and outputs the acquired MIB data to the job control portion 13. In general, MIB information is data provided by an apparatus to be monitored using Simple Network Management Protocol (SNMP), which is a protocol for monitoring an apparatus, in order to inform the outside of the state of the apparatus. The MIB information of the printing device 20 is information indicating the state of the printing device 20 and, for example, includes information on a processing state of print jobs in the second spooler 21 and the like. In the present exemplary embodiment, MIB information is used as an example of information related to a processing state.

The job control portion 13 in the first exemplary embodiment performs control of transferring a print job from the job storing portion 15 to the first spooler 14 in accordance with the processing state in the first spooler 14. On the other hand, in the present exemplary embodiment, the job control portion 13 acquires MIB information from the MIB acquiring portion 16, recognizes the processing state in the second spooler 21 based on the acquired MIB information, and executes a control of transferring a print job from the job storing portion 15 to the first spooler 14.

Here, the job control portion 13 acquires MIB information from the MIB acquiring portion 16 and monitors inside the second spooler 21 in the case where a print job whose transfer has been instructed by the job managing portion 12 but still untransferred to the first spooler 14 is stored in the job storing portion 15. The job control portion 13 determines whether a print job is transferable from the job storing portion 15 to the first spooler 14 or not.

In the determination, the job control portion 13 first acquires a status of a print job stored in the second spooler 21 based on the MIB information. In the case where the last job is in the status of being spooled in the second spooler 21 (being outputted from the first spooler 14 to the second spooler 21) or in the status of being completely spooled in the second spooler 21 (being completely outputted from the first spooler 14 to the second spooler 21), the job control portion 13 determines that a print job is transferable to the first spooler 14. That is, when the last job is started to be spooled in the second spooler 21, no print jobs waiting to be outputted to the printing device 20 exist in the first spooler 14, and therefore, the job control portion 13 determines that a new print job is transferable to the first spooler 14.

A transfer processing of the job control portion 13 is executed in the same way as the transfer processing shown in FIG. 3. However, in the present exemplary embodiment, the determining processing in step 101 is executed in accordance with the processing state in the second spooler 21 as described-above. In the case where the job control portion 13 transfers a print job to the first spooler 14 for the first time, the job control portion 13, for example, confirms that no print job is stored in the first spooler 14 and determines that a print job is transferable. The transfer determining processing in step 102 is executed by acquiring MIB information as described-above.

<Explanation of Transfer Determining Processing>

Figure 7:
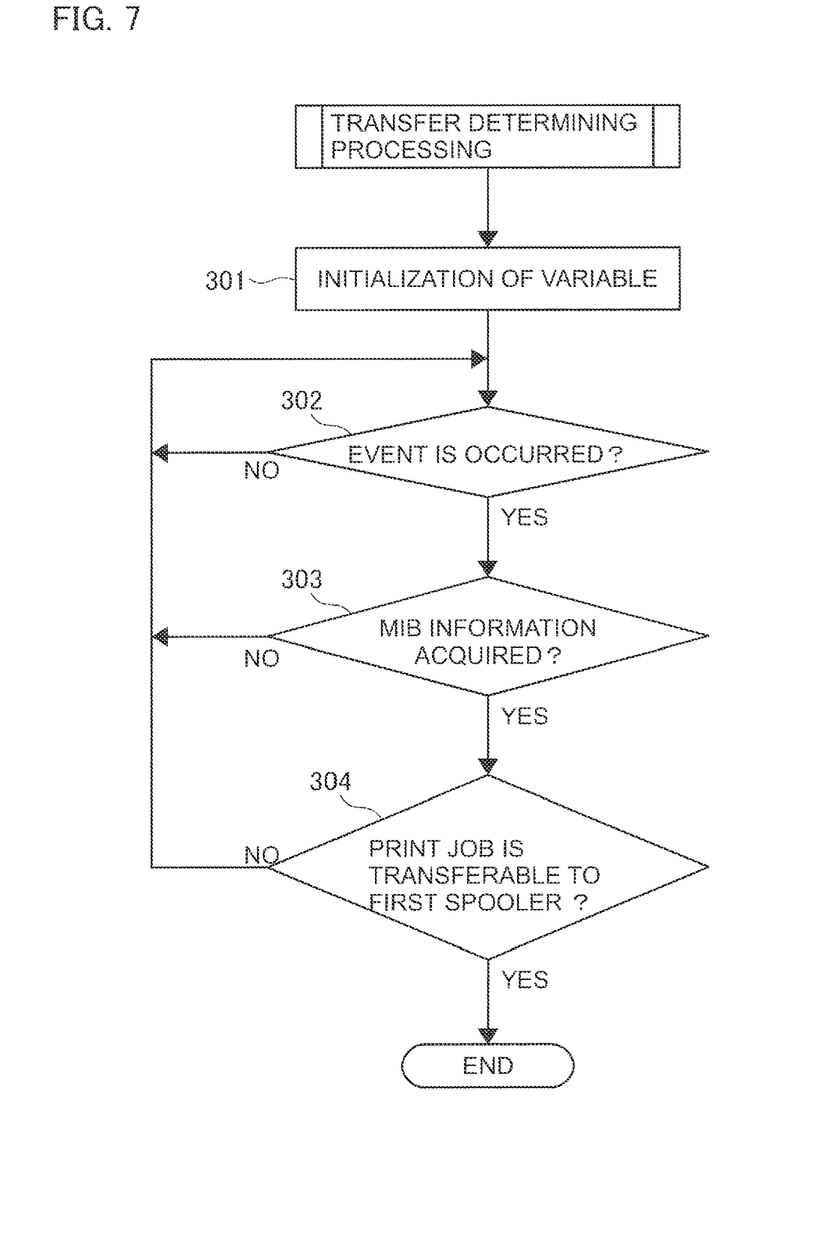
FIG. 7 is a flowchart showing a specific example of a procedure of transfer determining processing in the second exemplary embodiment.

Next, transfer determining processing by the job control portion 13 in the present exemplary embodiment will be explained. FIG. 7 is a flowchart showing a specific example of a procedure of transfer determining processing in the present exemplary embodiment.

First, the job control portion 13 executes an initialization of a variable (step 301). A processing in step 301 is the same as the processing of step 201 in FIG. 4, and the job control portion 13, for example, acquires a discrimination ID for discriminating the printing device 20 to which a print job is to be transferred.

Next, the print control portion 13 determines whether an event indicating some processing in the print control apparatus 10 is occurred or not (step 302). In the case where the event is occurred (YES in step 302), the job control portion 13 determines whether the occurred event is an acquisition of MIB information from the printing device 20 or not, based on the discrimination ID and the like (step 303). On the other hand, in the case where the event is not occurred (NO in step 302), the job control portion 13 waits until the event is occurred.

Next, in step 303, in the case where the occurred event is an acquisition of MIB information (YES in step 303), the job control portion 13 recognizes the processing state of the second spooler 21 based on the acquired MIB information, and determines whether a print job is transferable to the first spooler 14 or not (step 304). In the case where the last job is in the status of being spooled in the second spooler 21 or in the status of being completely spooled in the second spooler 21, the job control portion 13 determines that a print job is transferable to the first spooler 14 (YES in step 304). In the case of a positive determination (YES) in step 304, the present processing flow is completed. After the present processing flow is completed, the processing of step 103 in FIG. 3 is sequentially executed.

On the other hand, in the case where the occurred event is not an acquisition of MIB information (NO in step 303), the process moves to step 302. In the case where the last job is neither in the status of being spooled in the second spooler 21 nor in the status of being completely spooled in the second spooler 21, that is, for example, in the case where the last job has not been started to be outputted to the second spooler 21, the job control portion 13 determines that a print job is not transferable to the first spooler 14 (NO in step 304). In the case of a negative determination (NO) in step 304, the process moves to step 302.

In such a manner, the job control portion 13 waits while monitoring the processing state in the second spooler 21 until the job control portion 13 determines that a print job is transferable to the first spooler 14, that is, until the last job is in the status of being spooled in the second spooler 21 or in the status of being completely spooled in the second spooler 21.

<Specific Example of Transfer Processing of Print Job>

Next, a specific example of a processing of a print job transferred from the print control apparatus 10 to the printing device 20 will be explained. Here, explanation will be made by using the examples shown in FIG. 5-1A, FIG. 5-1B, FIG. 5-2C, FIG. 5-2D, FIG. 5-3E, and FIG. 5-3F.

Firstly, in the case where the job 1 is not transferred to the first spooler 14, the job control portion 13 determines that the job 1 is transferable to the first spooler 14 and transfers the job 1 from the job storing portion 15 to the first spooler 14 as shown in FIG. 5-1A. When the job 1 is completely transferred to the first spooler 14, the job control portion 13 sequentially outputs the job 1 from the first spooler 14 to the second spooler 21 as shown in FIG. 5-1B.

Here, as shown in FIG. 5-1A, while the last job (that is, the job 1) has not been outputted to the second spooler 21, the job control portion 13 determines that the job 2, which is the next print job, is not transferable to the first spooler 14. On the other hand, as shown in FIG. 5-1B, when the job 1 is started to be outputted to the second spooler 21, the status of the last job (the job 1) becomes the status of being spooled in the second spooler 21. Therefore, the job control portion 13 regards the status of the last job as the status of being spooled in the second spooler 21 based on the MIB information acquired from the MIB acquiring portion 16, and determines that the job 2, which is the next print job, is transferable to the first spooler 14. The job control portion 13 starts to transfer the job 2 as shown in FIG. 5-2C.

When the job 2 is started to be transferred, as shown in FIG. 5-2C and FIG. 5-2D, while the last job (that is, the job 2) has not been outputted to the second spooler 21, the job control portion 13 determines that the job 3, which is the next print job, is not transferable to the first spooler 14. On the other hand, as shown in FIG. 5-3E, when the job 2 is started to be outputted to the second spooler 21 after the job 1 has been completely outputted to the second spooler 21, the status of the last job (the job 2) becomes the status of being spooled in the second spooler 21. Therefore, the job control portion 13 determines that the job 3 is transferable to the first spooler 14, and the job 3 is started to be transferred as shown in FIG. 5-3F.

When the job 2 is completely outputted to the second spooler 21 and the job 3 is completely transferred to the first spooler 14, the job 3 is to be outputted from the first spooler 14 to the second spooler 21. Therefore, since the status of the last job (that is, the job 3) becomes the status of being spooled in the second spooler 21, the next job 4 is started to be transferred from the job storing portion 15 to the first spooler 14. In the similar procedure, the job 5 is to be transferred from the job storing portion 15 to the first spooler 14.

As explained above, the job control portion 13 monitors the processing state in the second spooler 21, and when the last job is in the status of being spooled in the second spooler 21 or in the status of being completely spooled in the second spooler 21, a print job is newly transferred from the job storing portion 15 to the first spooler 14. That is, transfer control of a print job is executed based on the processing state in the second spooler 21. Therefore, utilizing the print control apparatus 10 suppresses a decrease of processing speed of a print job and prevents the order of a print processing from being changed.

In the first exemplary embodiment and the second exemplary embodiment, after the first spooler 14 outputs a print job, the first spooler 14 still stores the print job until the print processing is completed in the printing device 20; however, for example, the print job may be removed at the point of being outputted to the printing device 20. In this case, in the first exemplary embodiment, when the last job is completely outputted from the first spooler 14 to the printing device 20, the job control portion 13 confirms that no print job is stored in the first spooler 14 and determines that a new print job is transferable to the first spooler 14. The first spooler 14, for example, may keep storing a part of data of a print job completely outputted to the printing device 20 such as a status of the print job.

In the first exemplary embodiment and the second exemplary embodiment, the printing control system 1 includes one printing device 20 and one operation terminal 30; however, the printing control system 1 may include plural printing devices 20 and plural operation terminals 30. In the case where the printing system 1 includes plural printing devices 20, the operation terminal 30 designates a printing device 20 as a destination of a print job and transmits the print job to the print control apparatus 10. Since the first spooler 14 is provided per a printing device 20 to be a destination of a print job, each processing of the printing devices 20 is executed in parallel.

<Hardware Configuration of Printing Control Apparatus>

Figure 8:
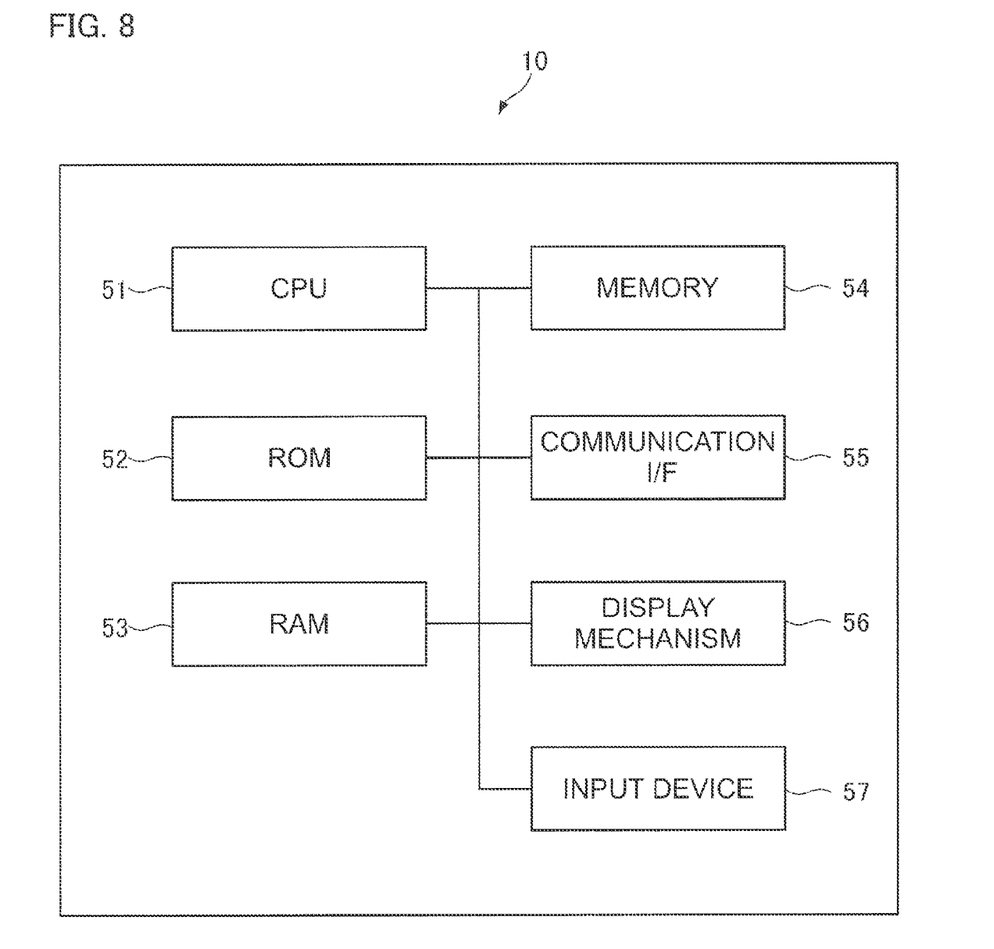
FIG. 8 is a diagram showing a hardware configuration example of the printing control apparatus in the present exemplary embodiment.

Next, a hardware configuration of the print control apparatus 10 in the first exemplary embodiment and the second exemplary embodiment will be explained. FIG. 8 is a diagram showing a hardware configuration example of the printing control apparatus 10 in the present exemplary embodiment. As shown in the figure, the print control apparatus 10, for example, is realized by a configuration of a general-purpose computer, and includes a Central Processing Unit (CPU) 51 as an arithmetic unit, a Read Only Memory (ROM) 52 as a memory unit, a Random Access Memory (RAM) 53, and a memory 54.

The ROM 52 stores various programs, and the RAM 53 is used as a working memory when the CPU 51 executes the various programs. The memory 54 is, for example, a memory area for storing input data and output data and the like of the various programs. The ROM 52 stores a program for implementing each function of the print control apparatus 10 in the first exemplary embodiment and the second exemplary embodiment. The program is loaded onto the RAM 53 and a processing based on the program is executed by the CPU 51, and thereby each function of the print control apparatus 10 is achieved. The print control apparatus 10 includes a communication I/F 55, a display mechanism 56 as a display device such as a liquid crystal display, an organic Electroluminescence (EL) display and the like, and an input device 57 such as a keyboard and a mouse.

Specifically, in the print control apparatus 10, with the instructions of the CPU 51, the functions of the receiving portion 11, the job managing portion 12, the job control portion 13, the MIB acquiring portion 16 and the like are achieved. The job storing portion 15 is, for example, achieved by the memory 54. Further, such as receipt of a print job by the receiving portion 11 and acquisition of MIB information by the MIB acquiring portion 16 are executed, for example, through the communication I/F 55.

<Explanation of Program>

A processing executed by the print control apparatus 10 in the present exemplary embodiment in the above explanation is, for example, provided as a program such as application software as described above.

Therefore, a processing executed by the print control apparatus 10 in the present exemplary embodiment can be recognized as a program for realizing, on a computer, a function of receiving a print instruction to instruct printing on a recording medium, a function of transferring a received print instruction to an outputting portion that is capable of storing plural print instructions therein and outputs a stored print instruction one by one to a printing device, and a function of transferring another received print instruction to the outputting portion when a print instruction transferred to the outputting portion last is started to be outputted from the outputting portion to the printing device.

The program that achieves the present exemplary embodiment may be provided not only by a communication unit but also by being stored in a recording medium such as a CD-ROM.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment as chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing control apparatus comprising:
   a receiving unit configured to receive a print instruction to instruct printing on a recording medium;
   a transferring unit configured to transfer the print instruction received by the receiving unit to an outputting portion capable of storing a plurality of print instructions, and to output the stored print instructions one by one to a printing device; and
   a controller configured to control the transferring unit so that another print instruction is transferred to the outputting portion, in response to a previous print instruction transferred by the transferring unit starting to be outputted from the outputting portion to the printing device,
   wherein in the outputting portion, among the print instructions transferred by the transferring unit to the outputting portion, a sum of the print instructions being transferred to the outputting portion and the print instructions waiting to be outputted to the printing device is prevented from ever becoming two or more.

2. The printing control apparatus according to claim 1, further comprising a monitoring unit configured to monitor a processing state of the print instruction stored in the outputting portion,
   wherein the controller is configured to control the transferring unit so that another print instruction is transferred to the outputting portion, in response to the monitoring unit detecting that the previous print instruction transferred by the transferring unit is being outputted or is completely outputted from the outputting portion to the printing device.

3. The printing control apparatus according to claim 1, wherein the controller is further configured to control the transferring unit so that another print instruction is transferred to the outputting portion, in response to no print instruction existing in the outputting portion.

4. The printing control apparatus according to claim 2, wherein the controller is further configured to control the transferring unit so that another print instruction is transferred to the outputting portion, in response to no print instruction existing in the outputting portion.

5. The printing control apparatus according to claim 1, further comprising an acquiring unit configured to acquire information related to a processing state of the print instruction in the printing device,
   wherein the controller is configured to control the transferring unit based on the information related to the processing state acquired by the acquiring unit so that another print instruction is transferred to the outputting portion, in response to the previous print instruction transferred by the transferring unit being outputted or being completely outputted from the outputting portion to the printing device.

6. A printing control system comprising:
   a printing device configured to perform a print processing based on a print instruction to instruct printing on a recording medium; and
   a printing control apparatus configured to be connected with the printing device via a communication line,
   wherein the printing control apparatus includes:
      a receiving unit configured to receive the print instruction;
      a transferring unit configured to transfer the print instruction received by the receiving unit to an outputting portion capable of storing a plurality of print instructions, and to output the stored print instructions one by one to the printing device; and
      a controller configured to control the transferring unit so that another print instruction is transferred to the outputting portion, in response to a previous print instruction transferred by the transferring unit starting to be outputted from the outputting portion to the printing device, and
   wherein in the outputting portion, among the print instructions transferred by the transferring unit to the outputting portion, a sum of the print instructions being transferred to the outputting portion and the print instructions waiting to be outputted to the printing device is prevented from ever becoming two or more.

7. A non-transitory computer readable medium storing a program causing a computer to execute a processing for controlling a printing control apparatus, the processing comprising:
   receiving a print instruction to instruct printing on a recording medium;
   transferring the received print instruction to an outputting portion capable of storing a plurality of print instructions and outputting the stored print instructions one by one to a printing device; and
   transferring another received print instruction to the outputting portion, in response to a previous print instruction transferred to the outputting portion starting to be outputted from the outputting portion to the printing device; and
   preventing a sum of the print instructions being transferred to the outputting portion and the print instructions waiting to be outputted to the printing device from ever becoming two or more.

* * * * *